(12) United States Patent
Silvestrini et al.

(10) Patent No.: US 10,377,320 B2
(45) Date of Patent: Aug. 13, 2019

(54) VEHICLE GLAZING COMPRISING A MOUNTING PLATE FOR FIXING SEVERAL ACCESSORIES, MOUNTING PLATE AND FIXING METHOD

(71) Applicant: SAINT-GOBAIN GLASS FRANCE, Courbevoie (FR)

(72) Inventors: Laurent Silvestrini, Bussy (FR); Raymond Brebion, Saint Martin Boulogne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/572,043

(22) PCT Filed: Apr. 29, 2016

(86) PCT No.: PCT/FR2016/051015
§ 371 (c)(1),
(2) Date: Nov. 6, 2017

(87) PCT Pub. No.: WO2016/177955
PCT Pub. Date: Nov. 10, 2016

(65) Prior Publication Data
US 2018/0141500 A1  May 24, 2018

(30) Foreign Application Priority Data
May 7, 2015 (FR) ..................... 15 54095

(51) Int. Cl.
*G02B 5/136* (2006.01)
*B60R 11/04* (2006.01)
(Continued)

(52) U.S. Cl.
CPC ............... *B60R 11/04* (2013.01); *B60R 1/04* (2013.01); *B60R 1/10* (2013.01);
(Continued)

(58) Field of Classification Search
CPC ..... B60R 2011/0026; B60R 2011/0063; B60R 11/04; B60R 2011/0288; B60R 9/02; B60S 1/0881
(Continued)

(56) References Cited

U.S. PATENT DOCUMENTS 5,805,367 A * 9/1998 Kanazawa ............... B60R 1/088
359/267
2007/0053087 A1 * 3/2007 Courbon ............... B60R 1/0605
359/879

FOREIGN PATENT DOCUMENTS

DE         102 11 444 A1    10/2003
DE   10 2012 021571 A1     5/2014
(Continued)

OTHER PUBLICATIONS

International Search Report as issued in International Patent Application No. PCT/FR2016/051015, dated Jul. 6, 2016.

*Primary Examiner* — Euncha P Cherry
(74) *Attorney, Agent, or Firm* — Pillsbury Winthrop Shaw Pittman LLP

(57) ABSTRACT

A vehicle glazing includes a glazed element, at least one mounting plate for the reversible attachment of an accessory to the glazed element, the mounting plate having an exterior face which is fixed facing an interior face of the glazed element, and including at least one mount for the reversible attachment of another accessory to the glazed element, wherein the mount is mechanically connected by at least one connecting arm connecting the mount to the mounting plate and the mount having an exterior face which is fixed facing an interior face of the glazed element.

16 Claims, 3 Drawing Sheets

(51) Int. Cl.
*B60R 1/04* (2006.01)
*B60R 1/10* (2006.01)
*B60S 1/08* (2006.01)
*B60R 11/00* (2006.01)
*B60R 11/02* (2006.01)

(52) U.S. Cl.
CPC ............ *B60R 2011/0003* (2013.01); *B60R 2011/0026* (2013.01); *B60R 2011/0063* (2013.01); *B60R 2011/0288* (2013.01); *B60S 1/0881* (2013.01)

(58) Field of Classification Search
USPC .......................................................... 359/548
See application file for complete search history.

(56) References Cited

FOREIGN PATENT DOCUMENTS

| | | |
|---|---|---|
| DE | 10 2012 024274 A1 | 6/2014 |
| EP | 2 705 986 A1 | 3/2014 |

\* cited by examiner

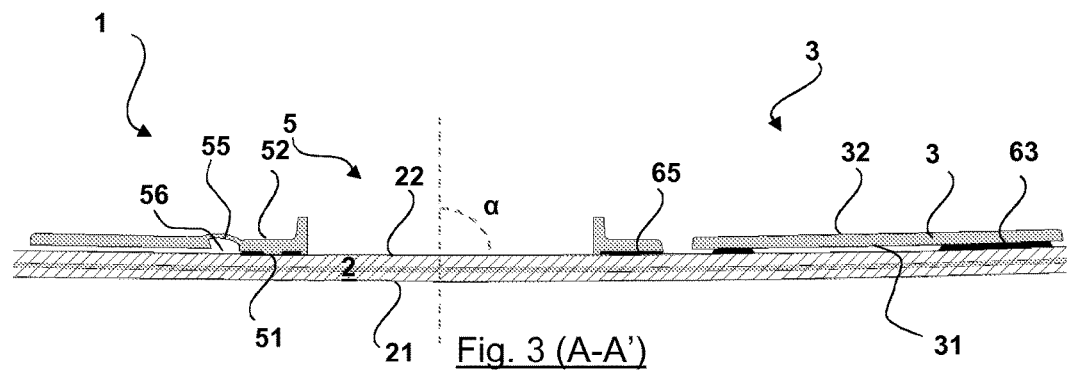
Fig. 3 (A-A')
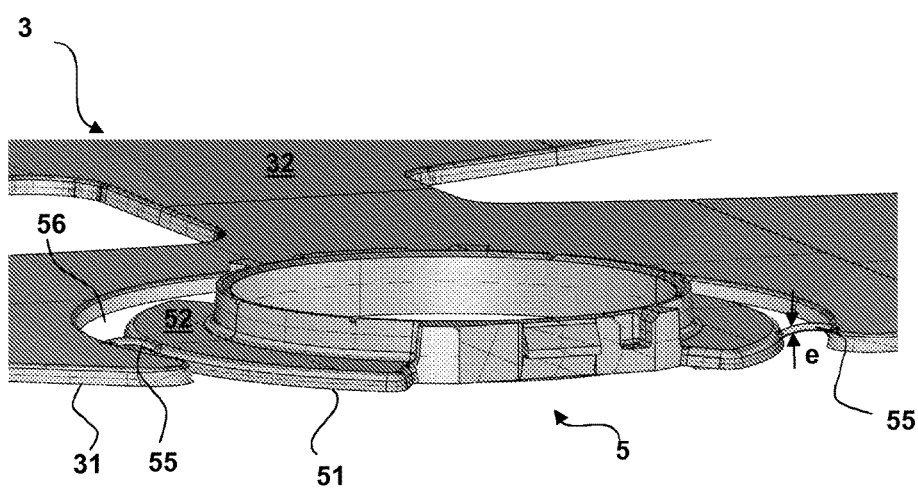
Fig. 4
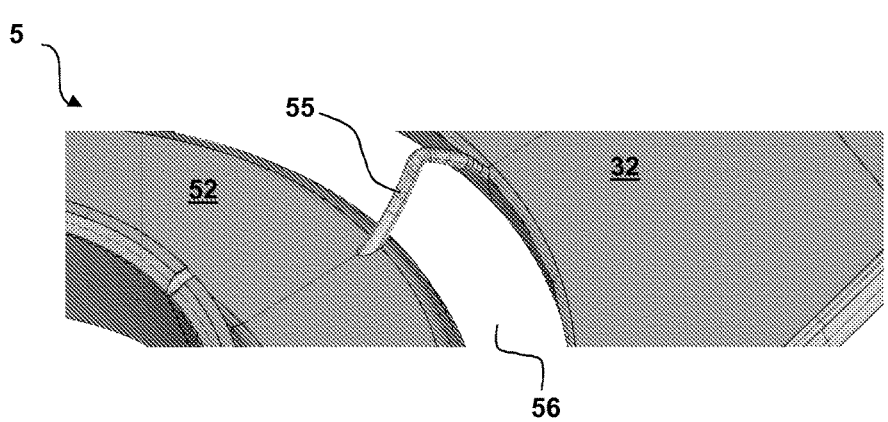
Fig. 5

VEHICLE GLAZING COMPRISING A MOUNTING PLATE FOR FIXING SEVERAL ACCESSORIES, MOUNTING PLATE AND FIXING METHOD

CROSS-REFERENCE TO RELATED APPLICATIONS

This application is the U.S. National Stage of PCT/FR2016/051015, filed Apr. 29, 2016, which in turn claims priority to French patent application number 1554095 filed May 7, 2015. The content of these applications are incorporated herein by reference in their entireties.

FIELD

The present invention relates to the fixing of accessories to vehicle glazing and, more particularly, motor vehicle glazing.

BACKGROUND

A mounting plate and/or a mount and/or a baseplate is (or are) usually each fixed against the interior face of a glazed element of vehicle glazing so as to allow one (or several) accessory (accessories) to be mechanically attached to this interior face via, respectively, the mounting plate, the mount and the baseplate.

The accessories may for example be a rain and/or light sensor or even a detector or a camera or a display screen.

Accurate positioning and accurate fixing of the mounting plate, the mount and the baseplate against the interior face of the glazed element then allows accurate positioning and attachment of the accessory against, or almost against, this interior face.

The mounting plate, the mount or the baseplate each need to be positioned and fixed with precision because a hole is also made in the enamel strip or the like situated at the periphery of the glazing, so as to align with a hole made in the mounting plate, the mount or the baseplate and allow the accessory to operate without being impeded by the enamel strip or the like.

This bonding operation is performed in a specialist workshop, as a rework operation, when the glazing is almost complete, before it is delivered for positioning and fixing into the bodywork opening that it is to close.

This operation is a lengthy one when a polymerizable adhesive is used because polymerization takes time and the glazing cannot be moved during this time without the risk of altering the position of the mounting plate, the mount or the baseplate. A waiting period of four days is generally observed before the glazing is picked up.

This operation can be performed more rapidly using double-sided sticky tape, but such fixing is less precise and less reliable.

This operation of fixing the mounting plate, the mount or the baseplate is a tricky one because each has its own frame of reference.

The precision with which each element is positioned with respect to the others is affected with a degree of spread.

Prior art patent application DE 10 2012 024 274 discloses glazing comprising a mounting plate for fixing an interior rear-view mirror, to which plate a mount can be mechanically attached for fixing an electronic device. The mounting plate and the mount are thus two different components and the means for reversibly attaching the one to the other entail referencing each element separately when they are being fixed to the glazed element.

Prior art patent application EP 2 705 986 discloses glazing comprising a mounting plate which itself comprises a mount. The single component thus visible in that document does not allow differential referencing of the means that allow the two accessories to be fixed.

SUMMARY

It is an object of the present invention to overcome the disadvantages of the prior art by providing a particular way of assembling a mounting plate with a mount and of fixing this assembly to a glazed element, or even a particular way of assembling this mounting plate with, on the other hand, a baseplate and for fixing this assembly to a glazed element, so that the fixing of these intermediate means which themselves allow the reversible attachment of accessories is both quicker and very secure.

Moreover, the present invention intends to propose a method that is easier to implement and more reliable at fixing a mounting plate and a mount to the glazed element, or even a mounting plate, a mount and a baseplate to the glazed element.

Furthermore, the present invention intends to propose a solution that makes it possible to minimize the tolerances on the positioning of the components (mounting plate, mount, baseplate) to the tolerances on the design and manufacture of the mounting plate itself.

The present invention thus relies upon a solution using at least one mechanical connection between the components, which means to say a mechanical connection between a mounting plate and a mount or even between this mounting plate and, in addition, a baseplate.

There is therefore the matter of providing a single component for which a means that allows the attachment of an accessory (for example a mount or a baseplate) can be oriented differently from another means (for example a mounting plate) that allows the attachment of another accessory.

The present invention relates to glazing according to claim 1 and the dependent claims define advantageous solutions.

Thus, according to the invention, vehicle glazing comprises a glazed element and at least one mounting plate for the reversible attachment of an accessory (first accessory) to said glazed element, said mounting plate having an exterior face which is fixed facing an interior face of said glazed element.

This glazing is notable in that it comprises at least one mount for the reversible attachment of another accessory (second accessory) to said glazed element, said mount being mechanically connected by at least one connecting arm connecting said mount to said mounting plate and said mount having an exterior face which is fixed facing an interior face of said glazed element.

Before the mounting plate is fixed, for example by adhesive bonding, to the interior face of the glazed element, the mechanical connection between the mount and the mounting plate is solely via said arm or arms if there are several of these.

The mounting plate therefore differs from a component as known from the prior art, which is one piece or in several parts, that allowed the fixing of several accessories but did not allow the position of an accessory support to be modified with respect to the other accessory support prior to definitive fixing to the glazed element.

The mount is preferably separated from the mounting plate by a slot and this slot has the connecting arm or arms passing across or straddling it; this slot is straddled only by this or these connecting arms.

Said mounting plate has an overall plane (which preferably follows the overall curvature of the glazed element at this point); said connecting arm or said connecting arms preferably do not lie in this overall plane of the mounting plate but diverge or diverges from this plane toward the inside.

This connecting arm or these connecting arms make or makes it possible to modify the orientation of the mount with respect to the mounting plate when attaching the mount to the interior face of the glazed element. This possibility to modify is guided, both in terms of depth and laterally and longitudinally (namely in all three directions of space) by the connecting arm or connecting arms; this guidance thus limits or constrains the possibilities for modifying the orientation of the mount.

In all cases, the mount is connected to the mounting plate at least up until the definitive fixing of the mount to the glazed element such that there is just one single main component to be handled.

The glazing according to the invention thus comprises a one-piece main component consisting of all the accessory supports:
  the mounting plate and the mount according to the invention,
  or the mounting plate, the mount and another accessory support such as a baseplate, etc.

In absolute terms, it is conceivable for a connecting arm, the connecting arm, some connecting arms or even all the connecting arms to be frangible and sometimes, or each time, broken at the time of fixing of the mount to the glazed element.

For preference, said mount is mechanically connected to said mounting plate only by said connecting arm (or arms).

"Attaching" or "attachment" within the meaning of the present invention is to be understood as meaning mechanical fasteners which can be attached and detached by hand or using a mechanical tool. That which is attached is thus in a fixed position.

"Fixing" within the meaning of the present invention is to be understood as meaning chemical fixings which give rise to molecular changes that are irreversible, unless the connection is broken rendering the mounting plate unusable.

"Connection" or "connected" within the meaning of the present invention is to be understood as meaning that a mechanical element makes a connection between two others and that this connection is permanent at least up until the fixing to the glazed element, but that which is connected in this way can move with respect to the thing to which it is connected, unless a fixing is opposing this movement. This connection thus belongs to the two elements connected.

Each of these three expressions excludes the other two.

In one particular version of the invention, the glazing furthermore comprises at least one baseplate for the reversible attachment of another accessory (third accessory) to said glazed element, said baseplate being mechanically connected by at least one connecting arm connecting said baseplate to said mounting plate and said baseplate having an exterior face which is fixed facing an interior face of said glazed element.

The baseplate is preferably separated from the mounting plate by a slot across which said connecting arm or arms passes or pass; this slot is straddled only by this or these connecting arms.

The slot (or slots) separating the mount and the mounting plate, or even the baseplate and the mounting plate, may be situated all around the baseplate or the mount respectively, except if this the baseplate or this mount is situated along a lateral edge of the mounting plate; each connecting arm respectively straddles said slot.

The connecting arm or arms connecting the baseplate to the mounting plate is (or are) respectively similar to the connecting arm(s) connecting the mount to the mounting plate: they may have different shapes (lengths, thicknesses) but perform the same function: allowing a change in orientation with respect to the mounting plate of the accessory support (baseplate, mount, etc.) connected to this mounting plate by this (these) connecting arms, both before and during the fixing of this accessory support to the glazed element. The baseplate and the mount may differ in shape: they each allow an accessory to be attached reversibly to said glazed element.

For preference, said baseplate and/or said mount is (or are) mechanically connected to said mounting plate by several connecting arms arranged preferably symmetrically with respect to one another and with respect to an axis passing through a center of said baseplate and/or of said mount respectively, or with respect to a plane passing through a center of said baseplate or of said mount respectively.

This symmetric arrangement in particular allows better distribution of the load passing through said connecting arms during adjustment of the position of the mount or of the baseplate with respect to the mounting plate.

For example, said baseplate and/or said mount is (or are) mechanically connected to said mounting plate by three connecting arms positioned 120° apart with respect to a center of said baseplate or respectively said mount, or by four connecting arms arranged symmetrically in pairs with respect to a plane of symmetry passing through a center of said baseplate or said mount respectively (for example 90° apart with respect to a center of said baseplate or, respectively, said mount).

For preference, said mounting plate, said baseplate and/or said mount are fixed to said interior face of said glazed element by two or even three identical adhesive substances.

For preference, said baseplate is mechanically connected to said mounting plate by said connecting arm (or arms) only.

For preference also, said connecting arm or each connecting arm is formed as an integral part with, on the one hand, said mounting plate and, on the other hand, said baseplate or said mount respectively, said connecting arm or each connecting arm preferably having:
  a width measured transversely to said slot, comprised between 0.5 and 3.0 mm and/or
  a thickness comprised between 0.5 and 3.0 mm.

In an alternative form, said connecting arm or each connecting arm is curved, so as to allow a more flexible connection. This bend is preferably oriented toward the inside.

It is moreover possible for said mounting plate to comprise elements for the reversible attachment of an interior cover.

The glazing according to the invention may comprise the accessories which are attached using the mounting plate, the mount, the baseplate, etc.

Said accessories are preferably selected from a list comprising: a rain sensor, a light sensor, a photographic sensor (apparatus for capturing a fixed image in the visible domain; analog or digital), an infrared sensor, a camera (apparatus for capturing a moving image in the visible domain; analog or digital), a rear-view mirror support, a display screen support.

For preference, said glazed element is a curved laminated glazed element.

The present invention moreover relates to a component for fixing an accessory to the glazing according to the invention, said component comprising at least a mounting plate and a mount for fixing another accessory, said mount being mechanically connected by at least one connecting arm to said mounting plate.

The present invention moreover relates to a method for fixing several accessories to the glazing according to the invention, said mounting plate being fixed to said interior face and said glazed element then the mount being fixed to said interior face of said glazed element while adjusting the position of said mount with respect to said mounting plate, this adjustment being constrained (or controlled) by at least one connecting arm.

The present invention thus makes it possible, by virtue of the connecting arm(s), to achieve a precision adjusted connection between the glazed element and the two accessories that are attached to this glazed element using the mounting plate and the mount, or even the three accessories attached to this glazed element using the mounting plate, the mount and the baseplate. This precise adjustment is preferably performed when fixing the mounting plate, the mount or even the baseplate to the glazed element.

Thus, for one piece of glazing and from one piece of glazing of the same series to another, on the one hand, the attachment of each accessory is firm and certain but is also reliable because it is optimized to the exact configuration of the glazing. This of particular importance in the case of laminated curved glazing in which there may be a certain degree of spread in the dimensions even within one series.

The present invention allows a number of functions (the functions of the accessories) to be integrated into a single component, while at the same time acknowledging the frame of reference of each function at the time of fixing to the glazed element: it also makes it possible to reduce the geometric spread between the functions and to reduce control and procurement costs.

BRIEF DESCRIPTION OF THE DRAWINGS

A number of embodiments are described hereinafter by way of nonlimiting example with reference to the attached drawings in which:

FIG. 3 is a view in section on AA' of FIG. 2, also partially showing in cross section a glazed element and the adhesive substance that fixes on the one hand the mounting plate and, on the other hand, the mount to the interior face of the glazed element;

FIG. 4 is a partial perspective view of FIG. 2 illustrating the mount and chiefly showing the interior face of this mount;

FIG. 5 is a detailed perspective view of FIG. 2 illustrating a connecting arm achieving a mechanical connection between the mount and the mounting plate;

DETAILED DESCRIPTION

In these figures, the various elements are drawn to scale within each figure but background elements are generally not depicted, in order to make the figures easier to understand.

Figure 1:
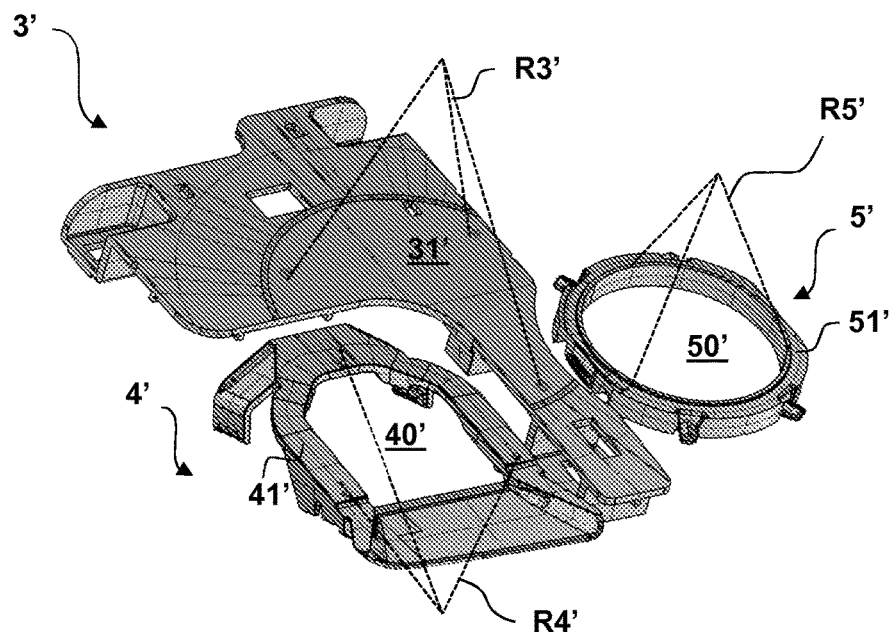
FIG. 1 is a perspective view of a mounting plate of the prior art for attaching an accessory to a glazed element, chiefly showing the exterior face of this mounting plate, and a mount and a baseplate which are both completely separate from this mounting plate for attaching two other accessories respectively.

FIG. 1 illustrates three means of reversible attachment of accessories of the prior art. These means are fixed against the interior face of a glazed element (not illustrated in this figure) so that each allows the attachment of one accessory.

These three means are, respectively, in this instance:

- a mounting plate 3' for the reversible attachment of an accessory, such as an interior rear-view mirror for example, to said glazed element, said mounting plate 3' having an exterior face 31' which is intended to be fixed to an interior face of a glazed element, facing this interior face of the glazed element;
- a baseplate 4' for the reversible attachment of another accessory, such as a camera for example, to said glazed element, the baseplate 4' having a hole 40' for the passage of part of this accessory and an exterior face 41' which is intended to be fixed to an interior face of the glazed element, facing this interior face of the glazed element; and
- a mount 5' for the reversible attachment of another accessory, such as a rain sensor for example, to said glazed element, said mount 5' having a hole 50' for the passage of part of this accessory and an exterior face 51' which is intended to be fixed to an interior face of the glazed element, facing this interior face of the glazed element.

These three means (or "components") are independent of one another: they are not in direct contact with one another and there is no mechanical connection element between them.

These three means are fixed via their respective exterior face 31', 41', 51' to the interior face of the glazed element independently:

the mounting plate 3' is fixed to the glazed element with respect to its frame of reference R3' which is specific to it;

the baseplate 4' is fixed to the glazed element with respect to its frame of reference R4' which is specific to it and independent of that of the mounting plate; and the mount 5' is fixed to the glazed element with respect to its frame of reference R5' which is specific to it and independent of that of the mounting plate and of the baseplate.

These three means may be fixed by three independent adhesive substances to the interior face of the glazed element; they may also be fixed using the same adhesive substance. This substance or these substances may be a double-sided sticky tape or a glue.

Of course, this adhesive substance is applied to the exterior face of the mounting plate, of the baseplate and of the mount in such a way that the holes in each of these three means which are used for attaching the accessories are free of adhesive substance.

The present invention relates to glazing 1, notably vehicle glazing like that which can be seen, in partial section, in FIG. 3.

As with glazing of the prior art, each piece of vehicle glazing 1 according to the invention comprises, as may be seen in FIG. 3, a glazed element 2 and at least one mounting plate 3 for the reversible attachment of an accessory (not illustrated) to said glazed element 2, said mounting plate 3 having, as in the prior art, an exterior face 31 fixed facing an interior face 22 of said glazed element 2.

The glazing 1 is intended to close an opening that forms the division between an interior space of the vehicle and a space external to the vehicle. The glazed element 2 thus has an exterior face 21 intended to face toward the exterior space, an interior face 22 intended to face toward the interior space, and a peripheral edge face.

Thus, when reference is made to the ideas of "interior" and "exterior" in the present document, it is always with reference to this consideration.

The glazed element may be a monolithic element, which means to say one made up of a single sheet of material or may be composite, which means to say made up of several sheets of material between which sheets is inserted at least one layer of adhesive substance in the case of laminated glazed elements/glazings. The sheet(s) of material may be mineral, notably made of glass, or organic, notably made of plastic.

In the case of vehicle glazing, the glazing generally has at least partially at its periphery, all around the edge of the interior face 22, a trim strip (not illustrated). This trim strip is generally the result of applying enamel to the interior face of the glazed element in the case of a monolithic element or to an interlayer face of the glazed element in the case of composite glazings, but may also be the result of partial and/or peripheral coloration of a sheet of material used, notably a sheet of organic material.

When the glazed element is made of organic material, it is manufactured prior to implementation of the invention by molding the material of which the glazed element is made in a molding device comprising a mold having at least one fixed mold part and one moving mold part capable of moving with respect to the fixed mould part, said mould parts collaborating when the mold is closed, during the molding step, to form a molding cavity which in cross section has the cross-sectional shape of the glazed element. Often, the glazed element made of organic material is not flat but curved.

When the glazed element is made of a mineral material, it is manufactured prior to implementation of the invention by melting mineral substance in a flat sheet, then by cutting and possibly bending and/or annealing this sheet.

When the glazed element is a composite glazed element, it is manufactured according to the well known technique for the manufacture of multiple or laminated curved glazing.

In FIG. 3, the glazed element 2 is a curved laminated glazing. In this particular instance, it is a windshield of a motor vehicle.

The mounting plate 3 comprises, on the one hand, an exterior face 31 intended to face toward the exterior space and which is intended to be fixed indirectly to an interior face of the glazed element facing this interior face of the glazed element and, on the other hand, an interior face 32 intended to face toward the interior space.

The mounting plate 3 having a hole 30 for the passage of part of an accessory and for the reversible attachment of this accessory.

Figure 2:
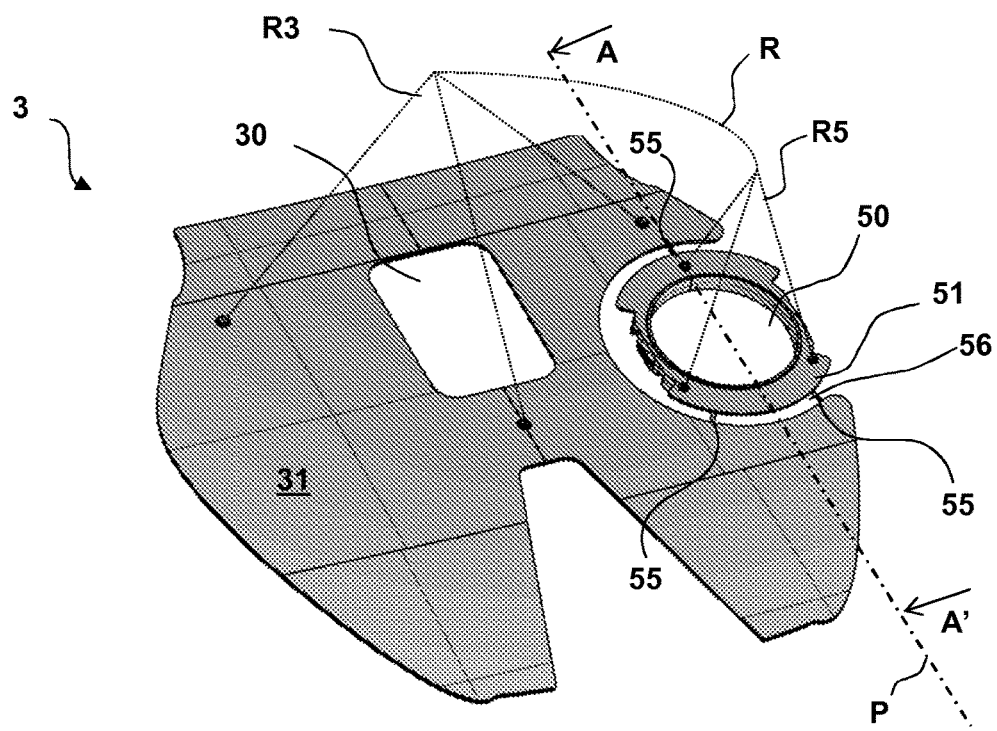
FIG. 2 is a perspective view of a mounting plate according to the invention for attaching an accessory to a glazed element chiefly showing the exterior face of this mounting plate, this mounting plate comprising a mount connected to this mounting plate, for the attachment of another accessory.

The mounting plate 3 according to the invention differs from the mounting plate of the prior art illustrated in FIG. 1 in that it comprises, as may be seen in FIG. 2, at least one mount 5 for the reversible attachment of another accessory to said mounting plate 3, said mount 5 being mechanically connected by at least one connecting arm 55 to said mounting plate 3 and having an exterior face 51 which is fixed facing an interior face 22 of said glazed element 2, as visible in FIG. 3.

The mount 5 has a hole 50 for the passage of part of the accessory, an exterior face 51 which is intended to be fixed indirectly to an interior face of the glazed element facing this interior face of the glazed element, and an interior face 52 that is intended to face toward the interior space.

Thus, the mounting plate 3 and the mount 5 are not two distinct means each for the reversible attachment of one accessory, but are two means connected to one another by at least one connecting arm, and preferably several connecting arms (in particular two, three or four arms) for the reversible attachment by each of these means of an accessory while at the same time allowing the orientation of the mount (especially the exterior face 52 thereof) to be modified/adjusted with respect to the mounting plate (and especially the exterior face 32 thereof) by movement of the mount which is guided and controlled by the connecting arm, or preferably arms, 55.

In the case of FIG. 2, these two means are fixed by their exterior face 31, 51 to the interior face 22 of the glazed element 2 in a dependent manner:

the mounting plate 3 is fixed to the glazed element with respect to its frame of reference R3, and the mount 5 is fixed to the glazed element with respect to its frame of reference R5, the two frames of reference being connected to one another in order to form a single frame of reference R, by virtue of the connecting arm(s) 55.

These two means may be fixed respectively by two independent adhesive substances 63, 65 to the interior face 22 of the glazed element; they may also be fixed using the one same adhesive substance. This substance or these substances may be a double-sided sticky tape or a glue.

Of course, this adhesive substance is applied to the exterior face of the mounting plate and of the mount in such a way that the holes in each of these means which are used for attaching the accessories are free of adhesive substance.

In FIG. 2, the mount 5 is attached to the mounting plate 3 by three connecting arms 55.

The mount is separated from the mounting plate by a slot 56 and this slot has the connecting arms 55 passing across it. This slot 56 could be situated all around the mount, but because the mount is situated along a lateral edge of the mounting plate, the slot does not go all the way around the mount.

These three connecting arms 55 are arranged symmetrically with respect to one another and with respect to a plane P passing through a center of said mount 5 and passing through an upper connecting arm 55. This plane of symmetry P is the plane of section A-A' illustrated in FIG. 2.

The other two connecting arms which are not in the plane P are arranged symmetrically with respect to the plane P and at an angle of around 30° with respect to the center of the mount.

As is visible more particularly in FIGS. 4 and 5, each connecting arm 55 is formed as an integral part of, on the one hand, the mounting plate 3 and, on the other hand, the mount 5; each connecting arm 55 preferably has a thickness e comprised between 0.5 and 3.0 mm, such as 2.0 mm for example.

The connecting arms are more slender than the mounting plate and the mount so as to give them a certain degree of flexibility and are curved inward; they are in the form of an arch and thus extend above the mean plane of the mounting plate embodied by the interior face 32 of the mounting plate.

The material of the mounting plate 3, of the mount 5 and of the connecting arms 55 may for example be: polyamide (notably PA 66), ABS or polyethylene.

The entirety of the component thus formed by the mounting plate 3, the mount 5 and the three connecting arms 55 may be manufactured for example by molding, in a single operation, and with very high precision.

By virtue of the connecting arms 55, the mount 5 can be oriented in its frame of reference R5 and with respect to the rest of the mounting plate 3, which means to say that it can be pushed in to a greater or lesser extent toward the glazed element and with a suitable orientation a with respect to the interior surface of the glazed element which is not necessarily a right angle.

Each connecting arm 55 is also curved inward in order to give a greater range of insetting.

Figure 6:
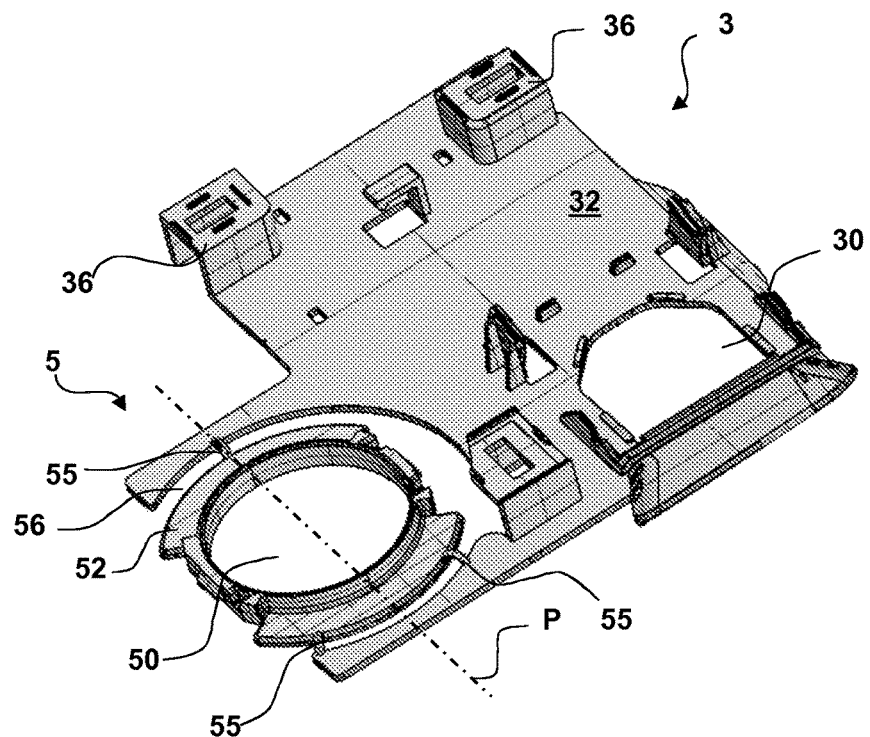
FIG. 6 is a perspective view of another mounting plate according to the invention for the attachment of an accessory to a glazed element chiefly showing the interior face of this mounting plate, a mount being connected to this mounting plate for the attachment of another accessory.

FIG. 6 is a perspective view of a mounting plate 3 similar to the mounting plate 3 of FIG. 2 except that it comprises elements 36 (clip-fastening holes) for the reversible attachment of an interior cover.

The mount 5 is separated from the mounting plate 3 by a slot 56 and the connecting arms 55 pass across this slot. This slot 56 could be situated all around the mount, but because the mount is situated along a lateral edge of the mounting plate, the slot does not go all the way around the mount.

The mounting plate 3 of FIG. 6 thus allows reversible attachment of:
an accessory to the mounting plate using the hole 30
another accessory to the mount 5 using the hole 50
an interior cover using the elements 36.

Figure 7:
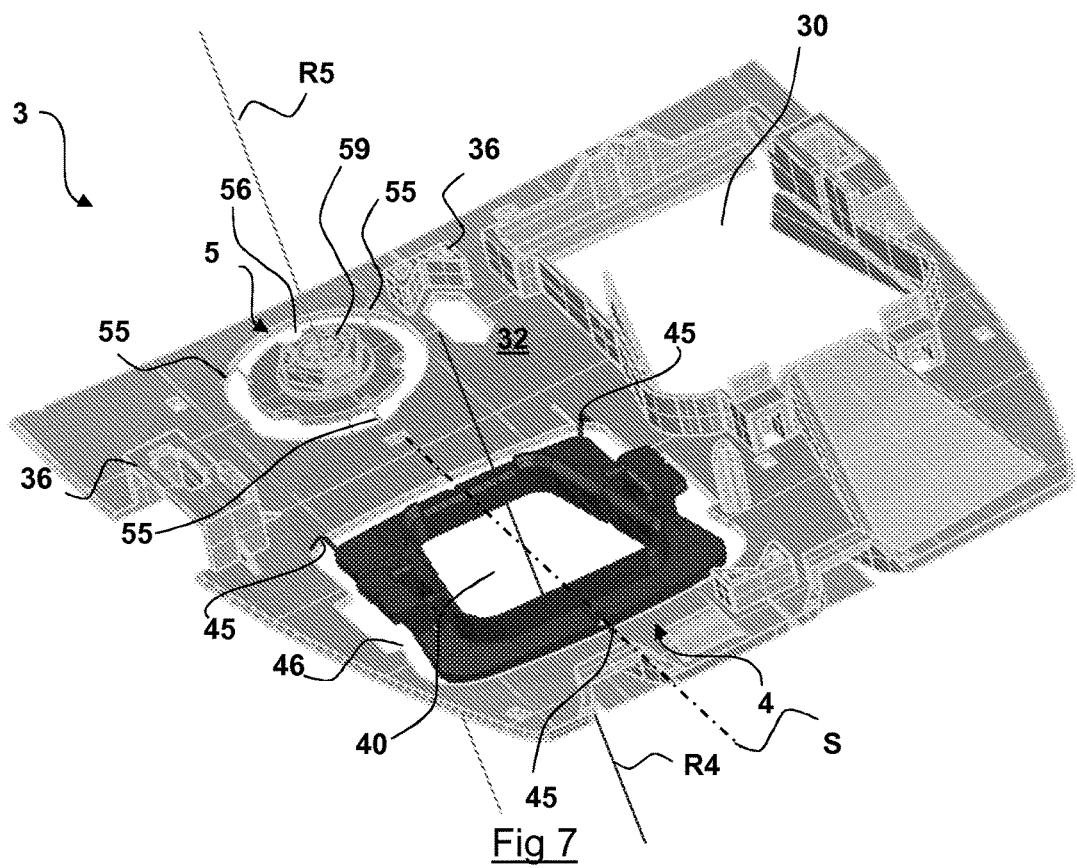
FIG. 7 is a perspective view of another mounting plate according to the invention for the attachment of an accessory to a glazed element chiefly showing the interior face of this mounting plate, a mount and a baseplate each being connected to this mounting plate, for the attachment of two other accessories.

FIG. 7 is a perspective view of a mounting plate 3 similar to the preceding one, except that:
the mount 5 is separated from the mounting plate 3 by a slot 56 across which the connecting arms 55 pass but this slot 56 is situated all around the mount because the mount is not situated along a lateral edge of the mounting plate;
the mount 5 further comprises a rain sensor 59, which is an accessory and which is attached reversibly to the mount 5 according to the frame of reference R5 of this mount;
there is also a baseplate 4 for the reversible attachment of another accessory, such as a camera (not illustrated) for example to said glazed element, the baseplate 4 having a hole 40 for the passage of part of this accessory and an interior face which is fixed to the interior face of the glazed element facing this interior face of the glazed element using adhesive substance.

This baseplate 4 is mechanically connected by at least one connecting arm 45 to the mounting plate 3 and in this instance by three connecting arms 45.

This baseplate 4 is fixed to the glazed element with respect to its frame of reference R4 which is specific to it and which is dependent on that of the mounting plate 3 by virtue of the connecting arms 45.

These three connecting arms 45 are arranged symmetrically with respect to one another and with respect to a plane S passing through a center of said baseplate 4 and passing through a lower connecting arm 45.

The other two connecting arms which are not in the plane S are arranged symmetrically with respect to the plane S and at an angle of around 45° with respect to the center of the baseplate.

The baseplate 4 is separated from the mounting plate 3 by a slot 46 across which the connecting arms 45 pass and this slot 46 is situated all around the baseplate 4 because the baseplate is not situated along a lateral edge of the mounting plate.

The mounting plate 3 of FIG. 7 thus allows reversible attachment of:
an accessory to the mounting plate via the hole 30
another accessory to the baseplate 4 via the hole 40
another accessory (the rain sensor 59) to the mount 5 via the hole 50
an interior cover via the elements 36.

The reversibly attachable accessories may be selected from a list comprising: a rain sensor, a light sensor, a photographic sensor (apparatus for capturing a fixed image in the visible domain; analog or digital), an infrared sensor, a camera (apparatus for capturing a moving image in the visible domain; analog or digital), a rear-view mirror support, a display screen support.

The single component which comprises at least the mounting plate 3 and the mount 5, or even at least the mounting plate 3, the baseplate 4 and the mount 5, is fixed to the interior face 22 of the glazed element by an automatic, semi-automatic or manual method.

The mounting plate 3 is first of all fixed to the interior face 22 via its exterior face 31, then the mount 5 is fixed to the interior face 22 via its exterior face 51, adjusting the position of the mount 5 with respect to the mounting plate 3, this adjustment being constrained by the connecting arms 55, then the baseplate 4 is fixed to the interior face 22, adjusting the position of the baseplate 4 with respect to the mounting plate 3, this adjustment being constrained by the connecting arms 45. In absolute terms, if there is a baseplate 4 it can be fixed before the mount 5.

The invention claimed is:

1. A vehicle glazing comprising a glazed element, at least one mounting plate for the reversible attachment of an accessory to said glazed element, said mounting plate having an exterior face which is fixed facing an interior face of said glazed element, and comprising at least one mount for the reversible attachment of another accessory to said glazed element, wherein said mount is mechanically connected by at least one first connecting arm connecting said mount to said mounting plate, said at least one first connecting arm being adapted to adjust an orientation of said mount relative to said mounting plate when said mount is mechanically connected to said mounting plate with said at least one first connecting arm, and said mount having an exterior face which is fixed facing the interior face of said glazed element.

2. The glazing as claimed in claim 1, wherein said mount is separated from said mounting plate by a slot and said slot has said at least one first connecting arm passing across or straddling it.

3. The glazing as claimed in claim 1, further comprising at least one baseplate for the reversible attachment of another accessory to said glazed element, said baseplate being mechanically connected by at least one second connecting arm connecting said baseplate to said mounting plate and said baseplate having an exterior face which is fixed facing the interior face of said glazed element.

4. The glazing as claimed in claim 3, wherein said baseplate is separated from said mounting plate by a slot across which said at least one second connecting arm passes.

5. The glazing as claimed in claim 3, wherein said baseplate and/or said mount is or are mechanically connected to said mounting plate by, respectively, several first and second connecting arms.

6. The glazing as claimed in claim 3, wherein said mounting plate, said baseplate and/or said mount are fixed to said interior face of said glazed element by two or even three identical adhesive substances.

7. The glazing as claimed in claim 3, wherein said at least one first connecting arm is formed as an integral part with said mounting plate and said mount, and said at least one second connecting arm is formed as an integral part with said mounting plate and said baseplate.

8. The glazing as claimed in claim 1, wherein said at least one first connecting arm is curved.

9. The glazing as claimed in claim 1, wherein said mounting plate comprises elements for the reversible attachment of an interior cover.

10. The glazing as claimed in claim 1, further comprising accessories selected from a group consisting of a rain sensor, a light sensor, a photographic sensor, an infrared sensor, a camera, a rear-view mirror support, and a display screen support.

11. The glazing as claimed in claim 1, wherein said glazed element is a curved laminated glazed element.

12. A component for fixing an accessory to the glazing as claimed in claim 1, said component comprising at least the mounting plate and the mount for fixing another accessory, said mount being mechanically connected by the at least one first connecting arm connecting said mount to said mounting plate and said mount having the exterior face which is intended to be fixed facing the interior face of said glazed element.

13. A method for fixing several accessories to the glazing as claimed in claim 1, comprising fixing said mounting plate to said interior face of said glazed element then fixing the mount to said interior face of said glazed element while adjusting a position of said mount with respect to said mounting plate, the adjustment being constrained by the at least one first connecting arm.

14. The glazing as claimed in claim 5, wherein said several first and second connecting arms are arranged, respectively, symmetrically with respect to one another and with respect to an axis passing through a center of said baseplate and/or of said mount respectively, or with respect to a plane passing through a center of said baseplate or of said mount respectively.

15. The glazing as claimed in claim 7, wherein each of said at least one first connecting arm and said at least one second connecting arm has a thickness comprised between 0.5 and 3.0 mm.

16. The glazing as claimed in claim 1, wherein said at least one first connecting arm is adapted to provide a flexible connection between the mount and the mounting plate.

* * * * *